US007711006B2

United States Patent
Dries et al.

(10) Patent No.: US 7,711,006 B2
(45) Date of Patent: May 4, 2010

(54) DATA MERGE UNIT, A METHOD OF PRODUCING AN INTERLEAVED DATA STREAM, A NETWORK ANALYSER AND A METHOD OF ANALYSING A NETWORK

(75) Inventors: William M. Dries, Southampton (GB); Kathryn E. Rickard, Romsey (GB)

(73) Assignee: Napatech A/S, Soeborg (DK)

( * ) Notice: Subject to any disclaimer, the term of this patent is extended or adjusted under 35 U.S.C. 154(b) by 908 days.

(21) Appl. No.: 10/564,731

(22) PCT Filed: Aug. 13, 2004

(86) PCT No.: PCT/GB2004/003498

§ 371 (c)(1),
(2), (4) Date: Jun. 19, 2006

(87) PCT Pub. No.: WO2005/018124

PCT Pub. Date: Feb. 24, 2005

(65) Prior Publication Data

US 2006/0268939 A1      Nov. 30, 2006

Related U.S. Application Data

(60) Provisional application No. 60/495,133, filed on Aug. 15, 2003.

(51) Int. Cl.
   *H04J 3/24*   (2006.01)
(52) U.S. Cl. ......................... 370/474; 370/428; 370/537
(58) Field of Classification Search ................. 370/474, 370/476, 465, 498, 537, 538, 540, 543, 544, 370/428, 429

See application file for complete search history.

(56) References Cited

U.S. PATENT DOCUMENTS

| 4,819,226 A | * | 4/1989 | Beckner et al. | 370/458 |
| 4,893,306 A | * | 1/1990 | Chao et al. | 370/458 |
| 5,197,062 A | | 3/1993 | Picklesimer | |
| 5,805,588 A | * | 9/1998 | Petersen | 370/356 |
| 6,041,051 A | * | 3/2000 | Doshi et al. | 370/352 |
| 6,058,109 A | | 5/2000 | Lechleider | |
| 6,584,121 B1 | * | 6/2003 | Garg et al. | 370/474 |
| 6,763,025 B2 | * | 7/2004 | Leatherbury et al. | 370/395.64 |

(Continued)

OTHER PUBLICATIONS

International Search Report for Application No. PCT/GB2004/003498.

*Primary Examiner*—Chi H. Pham
*Assistant Examiner*—Kevin Mew
(74) *Attorney, Agent, or Firm*—Pillsbury Winthrop Shaw Pittman, LLP (57) ABSTRACT

A data merge unit is provided for providing an interleaved data stream, the data stream including data frames received on two or more input channels, wherein data frames from each of the two or more input channels are arranged in time-slots of the interleaved data stream. The data merge unit comprises an input unit to receive data frames from two or more input channels, a frame merge buffer arranged to receive data frames from the two or more input channels via the input unit and store said data frames; and, an output generator to generate the interleaved data stream, the output generator being configured to select complete data frames from the frame merge buffer and arrange said complete data frames in the interleaved data stream.

16 Claims, 6 Drawing Sheets

U.S. PATENT DOCUMENTS

| | | | |
|---|---|---|---|
| 6,813,271 B1* | 11/2004 | Cable | 370/395.1 |
| 6,879,603 B1* | 4/2005 | Koenig et al. | 370/535 |
| 7,006,504 B2* | 2/2006 | Yoon et al. | 370/395.6 |
| 7,012,922 B1* | 3/2006 | Unitt et al. | 370/395.1 |
| 7,170,906 B2* | 1/2007 | Ofek et al. | 370/498 |
| 7,173,930 B2* | 2/2007 | Wellbaum et al. | 370/356 |
| 7,298,738 B1* | 11/2007 | Parruck et al. | 370/360 |
| 7,369,547 B1* | 5/2008 | Pandian et al. | 370/389 |
| 7,424,036 B1* | 9/2008 | Alexander et al. | 370/474 |
| 2002/0075902 A1* | 6/2002 | Abbas et al. | 370/474 |
| 2003/0002474 A1 | 1/2003 | Alexander et al. | |
| 2004/0213291 A1* | 10/2004 | Beshai et al. | 370/473 |

* cited by examiner

DATA MERGE UNIT, A METHOD OF PRODUCING AN INTERLEAVED DATA STREAM, A NETWORK ANALYSER AND A METHOD OF ANALYSING A NETWORK

CROSS REFERENCE TO RELATED APPLICATIONS

This is the U.S. National Phase of PCT/GB2004/003498, filed Aug. 13, 2004, which in turn claims priority to U.S. Provisional Patent Application No. 60/495,133, filed Aug. 15, 2003, both of which are incorporated herein in their entirety by reference.

The present invention relates to a data merge unit, a method of producing an interleaved data stream, a network analyser and a method of analysing a network.

On a communications network, data often in packets (or frames), typically travels between two points on the network in both directions. Data travelling from a source to a destination can cause subsequent data (a response) to travel from the destination back to the source. A network analyser may use two channels to capture the data travelling in both directions. The network analyser may then perform desired functions on the data to derive information about various aspects related to the network.

An important requirement of a network analyser is to be able to merge the two channels into a single interleaved data stream. The single interleaved data stream is then used for processing by analyser logic associated with the analyser. One type of communications network is known as Etherchannel, which uses up to eight Ethernet (or Gigabit Ethernet) channels in parallel for resiliency and load sharing. There is a requirement to analyse the traffic on these channels within such networks which again requires a method of merging channels into a single interleaved data stream. It is possible for a network to be operated using any required (or possible) number of channels. This merging of data into an interleaved data stream may be done using a data merge unit, often associated with a network analyser.

Conventionally, the merge function i.e. the merging of the data from plural channels into a single interleaved data stream is performed post capture of the data. Software, running on a host central processing unit (CPU), is conventionally used to provide the merge function. The software uses time stamps to order complete data frames as they are received by the analyser from the network. In one example of a conventional network analyser, the time stamps are generated by software utilising standard Network Interface Cards, as the data frames are received in a buffer associated with the analyser e.g. a host buffer.

Alternative improved conventional solutions preserve time stamp accuracy of frames on the network by applying the time stamp in hardware as the complete frames are received and tagging each frame with this time stamp in a descriptor field. In this case, to support merging of data or channels, time stamps are synchronised across multiple channels. Host software then uses the time stamps to reconstruct the merged data as an interleaved data stream post capture of the data.

Since the merge function is performed in software running on the host CPU, buffering of multi-channel data is required such that the merged data stream can be constructed. The process requires a large amount of memory for each of the host buffers and utilises a large percentage of CPU processing time for the merge function. As a result, the rate at which data can be processed and used is affected. It is likely that the processor will be unable to keep up with the incoming data rate at high network bandwidth utilisation rates, resulting in data frame loss. This is very undesirable for a network analyser and many other applications including network monitoring, intrusion detection & prevention and billing/mediation. Moreover the host CPU performance of other functions is affected since so much of its available processing time and resource is used in reconstructing the merged data stream.

Construction of the merged data stream requires the software to compare the time stamps of a current data frame for each channel. The lowest i.e. the first received on the network, is then copied into a merge buffer. The next data frame for that channel is then compared with the current data frame from the other channel, and the process continues. Upon construction of a suitable sized merge buffer, the buffer is then transferred to a host application for whatever functions it is desired to perform on the merged data stream.

The addition of the time stamp field to each frame to allow the software to merge the frames correctly increases the required system bandwidth as well as associated host buffering memory requirements. This is particularly significant for small frames where addition of data such as a time stamp to a frame can have a substantial effect on the size of each frame. This in turn increases the likelihood of frame loss at high network bandwidth utilisation, particularly for traffic which has a large percentage of small frames.

A further problem of the systems described above is that the independent nature of each hardware channel requires replication of hardware resources for each input channel. Functions such as frame decoders, filter comparators, frame stream buffers, Direct Memory Access (DMA) functions etc (which are typically required for processing received data prior to generation of an interleaved data stream in a network analyser) must be replicated for each channel, requiring higher logic count Gate Arrays or Field Programmable Gate Arrays (FPGAs) and multiple SDRAM Buffer resources. This therefore makes such systems more expensive.

According to a first aspect of the present invention, there is provided a data merge unit for providing an interleaved data stream, the data stream including complete data frames received from two or more input channels, wherein complete data frames from each of the two or more input channels are arranged in defined time-slots of the interleaved data stream, the data merge unit comprising: an input unit to receive data frames from two or more input channels and store said data frames; a frame merge buffer arranged to receive and data frames from the two or more input channels; and, an output generator to generate the interleaved data stream, the output generator being configured to select complete data frames from the frame merge buffer and arrange said complete data frames in the interleaved data stream.

The data merge unit enables complete data frames from a number of input channels to be merged into an interleaved data stream at full line rate. Accordingly, the problems of data frame loss encountered in network analysis using conventional data merge units is addressed. Furthermore, the data merge unit produces the interleaved data stream without requiring any software post-processing of captured data frames. There is therefore no host CPU utilisation other than system initialisation. The data merge unit is also able to operate without the necessity of tagging each received data frame with a time stamp (unless otherwise required). In conventional data merge units, time stamping is essential since software post-processing of captured data frames is performed using the time stamps. Thus, the data merge unit according to the present invention enables other system bandwidth requirements to be considerably lower.

Preferably, the data merge unit is arranged in hardware such as one or more ASICs or FPGAs or any other suitable type of programmable logic or application specific component. Provision of the data merge unit in hardware accelerates the merge function in comparison to merge functions performed with software.

Preferably, the input unit is arranged to identify the end of each of said data frames and generate a pointer to identify the location of the end of each of said data frames in the frame merge buffer, for use in generating the interleaved data stream.

Preferably, the output generator is operable in a first mode to select data complete frames in the frame merge buffer from an identified channel and output the selected frames in a corresponding time-slot of the interleaved data stream for that channel independently of other channels and, operable in a second mode in which complete data frames from two or more of the data channels are selected from the frame merge buffer and merged (in complete data frame order) and provided in a common time-slot of the interleaved data stream.

The data merge unit enables various output combinations of the interleaved data stream to be achieved. Time-slots within the interleaved data stream may be assigned to single channels or merged channels. In fact, combinations of single and merged channel interleaved data streams are achievable.

According to a second aspect of the present invention, there is provided a network analyser, comprising: a data merge unit according to the first aspect of the present invention; and, a logic unit to analyse the interleaved data stream provided by said data merge unit.

The network analyser is capable of full line rate performance ensuring that there is no data frame loss as sometimes occurs with conventional network analysers.

The network analyser enables complete data frames from a number of input channels to be merged into an interleaved data stream at full line rate. Accordingly, the problems of data frame loss encountered in network analysis using conventional data merge units are addressed. Furthermore, the analyser produces the interleaved data stream without requiring any software post-processing of captured data frames.

According to a third aspect of the present invention, there is provided a method of producing an interleaved data stream of complete data frames received on two or more input channels, the interleaved data stream being made up of complete data frames from each of the two or more input channels arranged in defined time-slots, the method comprising: receiving one or more complete data frames on two or more input channels, and storing a pointer to identify the end of each of said received data frames as located within the frame merge buffer; and, using said stored pointers to generate said interleaved data stream.

Preferably, the method comprises in a first mode outputting complete data frames from a selected channel in a corresponding time-slot of the interleaved data stream for that channel independently of other channels and in a second mode merging complete data frames from at least two of the two or more data channels and providing said merged data in a common time-slot of the output data stream.

An interleaved data stream may be produced that includes time-slots dedicated to a single input channel only and time-slots dedicated jointly to two or more merged input channels. In other words, this preferred embodiment of the method enables an interleaved data stream to be created with the flexibility of mixing merged and separate channels in the interleaved data stream.

In a preferred embodiment, merging complete data frames from input channels within a common time-slot of the interleaved data stream may be achieved when operating in the second mode, by providing a look up table of values to identify one or more complete data frames for transfer from the frame merge buffer for merging with one or more complete data frames from one or more other channels in a common time-slot of the interleaved data stream.

According to a fourth aspect of the present invention, there is provided a method of analysing a network, the method comprising; producing an interleaved data stream of complete data frames received on two or more input channels from a network to be analysed, according to the method of the third aspect of the present invention; providing said interleaved data stream to logic to analyse said data stream; and; analysing said data stream, thereby analysing the network.

According to a fifth aspect of the present invention, there is provided a data merge unit, comprising: input means to receive data frames from two or more input channels; a data merge unit to merge complete data frames received in the two or more input channels into a time division multiplexed interleaved data stream, wherein the data merge unit is arranged in hardware.

The data merge unit is arranged in hardware and enables full line rate data capture and merging. Furthermore, since the data merge unit is arranged in hardware the problems of large buffering requirements and CPU usage associated with conventional data merge units are addressed.

Embodiments of the present invention will now be described by way of example with reference to the accompanying drawings, in which:

FIG. 1 shows schematically a simplified example of a network analyser according to the present invention;

FIG. 2 shows schematically an example of an interleaved data stream;

FIG. 3 shows schematically the functional architecture of a data merge unit according to one example of the present invention;

FIG. 4 shows a round-robin input arbiter timing diagram for a four input data channel example;

FIG. 5 shows a timing diagram of data input to a frame merge buffer for use in a data merge unit according to one example of the present invention; and, FIG. 6 shows an output interface timing diagram and schematic block diagram of part of a data merge unit according to one example of the present invention.

Figure 01:
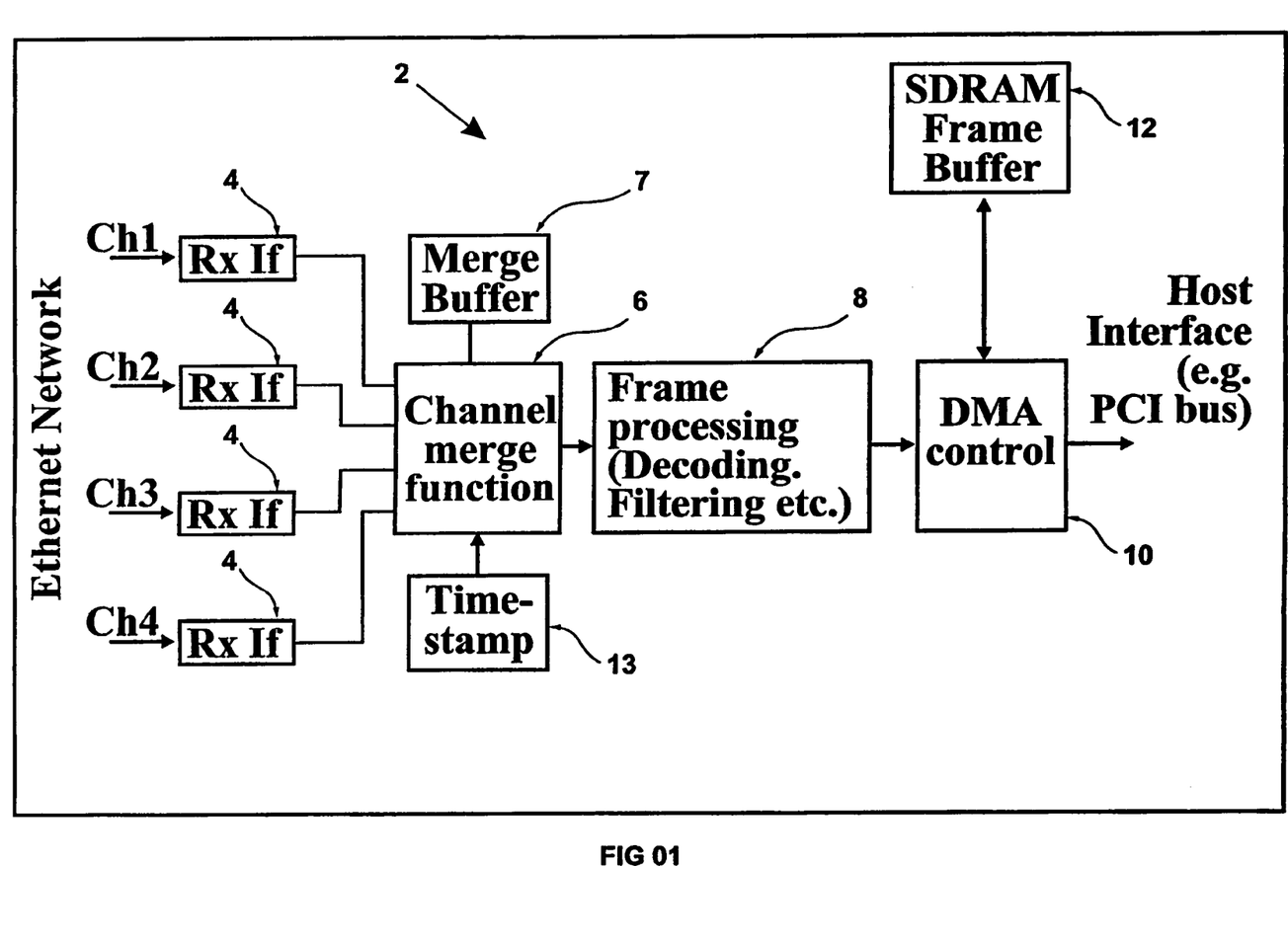

FIG. 1 shows schematically an example of a network analyser according to the present invention. In the example shown, the network analyser is arranged in an ASIC or FPGA. The network analyser could be arranged in one or more ASICs or FPGAs or any other suitably configured hardware. In this example, the ASIC or FPGA comprise the hardware in which the analyser is embodied. An external frame buffer RAM is provided and may be constructed from SDRAM as an example and is used to aid the data capture and DMA process of the interleaved data stream. In this example, the analyser 2 includes a data merge unit (shown in and described with reference to FIG. 3) that is embodied entirely in hardware ASIC or FPGA, and does not require software post-processing of captured data frames to produce an interleaved data stream. In alternative examples, certain components of the data merge unit, such as a frame merge buffer explained below, may be off-board with respect to the ASIC or FPGA.

In the example shown, the analyser 2, comprises a plurality of input ports 4 corresponding to each of channels Ch1 to Ch4. A channel merge function unit 6 is provided coupled to a merge buffer 7 and arranged to receive inputs from the input ports 4. As will be explained below the merge function unit 6 is operative to provide an interleaved data stream comprising complete data frames received from each of the channels Ch1 to Ch4 to common logic functions 8 of the network analyser 2. The network analyser 2 also includes a Direct Memory Access (DMA) control 10 to receive data from the common logic functions 8. A frame buffer 12 may also be provided coupled to the DMA control 10 operative to provide smoothing to account for variation in data processing rate. Means 13 for generating a time stamp is shown and optionally is included in the network analyser to time stamp received data frames.

In use, data frames are received at the input ports 4 corresponding to each of channels Ch1 to Ch4. These data frames are then transferred to the channel merge function unit 6 from which a single interleaved data stream consisting of complete data frames is output to the common logic functions 8 of the network analyser 2. These logic functions may be any logic functions that may be desired or required by the network analyser 2. Examples include, amongst others, network monitoring, intrusion detection and prevention, data filtering and billing/mediation, frame hard and dynamic slicing (shortening of frames in order to obtain more overall bandwidth), and network statistics gathering.

The interleaved data stream is then transferred to the MA control 10 and optionally via a frame buffer 12 configured as a FIFO buffer, to provide smoothing. The DMA control 10 then passes the data stream to its destination. The destination may be on a host computer or anywhere else the data stream may be required such as a single merged host buffer or multiple host buffers in dependence on the operation of the channel merge function unit 6 on the received data frames. Examples of the merge function unit 6 will be described in more detail below with reference to FIGS. 3 to 6.

Figure 02:
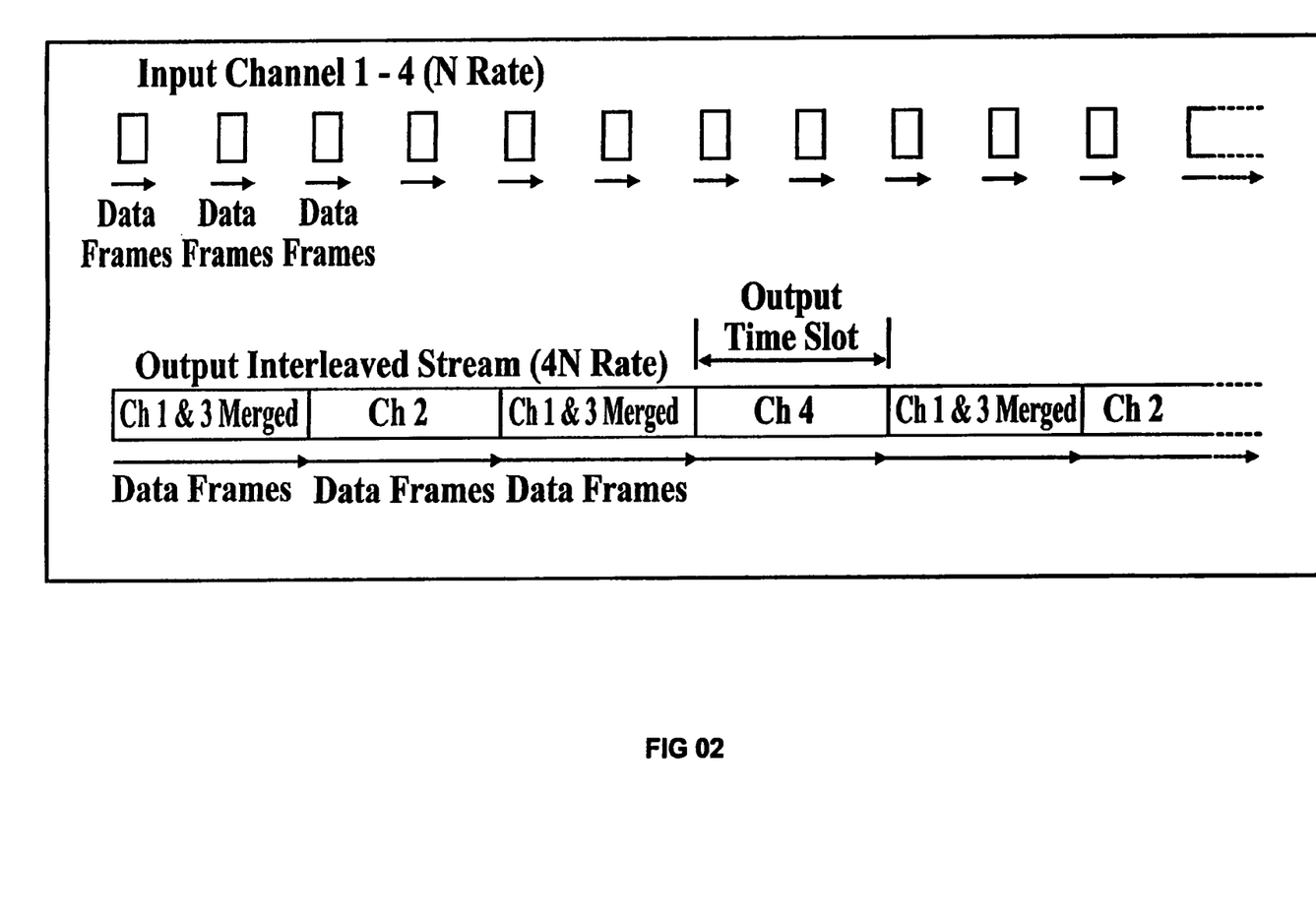

FIG. 2 shows schematically an example of an interleaved data stream. The interleaved data stream provided by the merge function unit 6 of FIG. 1 contains periods or time-slots, each containing sequential complete data frames either from a single channel (in which case a separate dedicated host buffer would be generally used to receive the data from the DMA control 10) or multiple channels, merged (interleaved) in receive order (in which case merged host buffers would be generally used to receive the data from the DMA control 10). This is illustrated by FIG. 2, using a 4 channel architecture as an example with Channels 1 and 3 being merged and Channels 2 and 4 running independently.

A time-slot in the interleaved data stream is effectively allocated to each host buffer data stream ensuring that downstream data functions such as the SDRAM frame buffer and DMA burst access across the system bus to the host CPU have long burst lengths to optimise performance. Channels can be merged into their own independent time slot in the interleaved data stream or they can be further merged with other channels into common time slots in the interleaved data stream. This further merging of channels can also be viewed as a separate channel interleaving process running within the overall interleaved data stream (time-slot based) interleaving process. Both merging into the interleaved data stream (within a dedicated time slot for the input channel) and merging within time slots are always performed on complete data frames.

As stated above, where independent hardware channels are used for routing and analysis of each input channel, replication of hardware resources becomes necessary. This is avoided by utilising a single output merged stream from the data merge unit described herein. However, if the data frames are themselves interleaved, i.e. on a data word basis, then partial results are required to be held on all shared post data merge functions. This can be exhaustive when a large spread of data frame sizes are supported along with many input streams and many post data-merge functions. By providing a system in which only complete data frames are provided in the merged data stream, this problem is avoided.

Each data frame within the interleaved data stream is tagged with a channel indicator. The channel indicator of a data frame enables subsequent logic to distinguish the source of the data frame as required and also enables the DMA controller 10 to transfer the data frame to the appropriate host buffer.

In theory, there are no restrictions on the number of input channels, the period of sequential data frames, and the interleaved output data stream combinations (single or merged) of input channels. Restrictions are purely implementation dependent.

Throughout the following description, the term "frame" is used to describe a data packet. The frame can be the data packet of any networking protocol. Examples include, but are not limited to ATM cells, SONET frames, Fibre Channel frame, TCP, IP and UDP etc. Optional additional data may be included with each frame, such as a time stamp, and this additional data may be tagged onto the frame.

Figure 03:
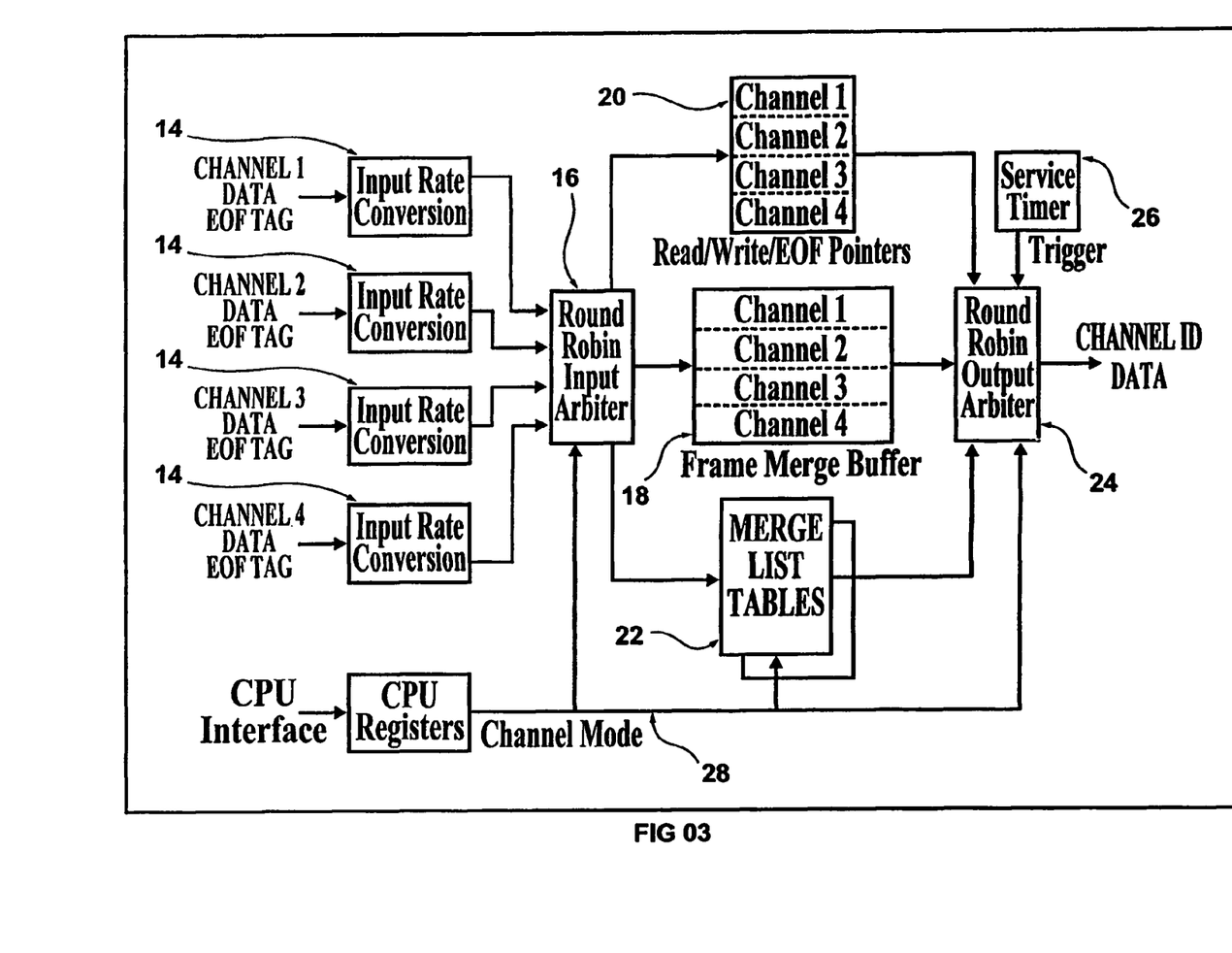

FIG. 3 shows schematically an example of the functional architecture of a data merge unit suitable for use in a network analyser according to the present invention. In the example shown there are four input channels although it will be appreciated that the analyser could in fact operate on any desired number of input channels. When data frames are received on the channels by the network analyser, as explained above with reference to FIG. 2, they may be configured in different ways depending on what is required of the data. For example, two channels may be merged within common time-slots of the interleaved (output) data stream or alternatively a channel may be allocated its own time-slot independently of any other channels within the interleaved data stream. Where four input channels are used, the possible configuration of the output data stream in terms of the time-slots (used for corresponding output channels) therein is as follows.

There may be:

4 independent output channels (no merging of input channels within time slots—each output channel including data frames from a single different input channel)

2 independent output channels and 2 merged output channels (the two independent output channels each including data frames from a single different input channel, and the two other output channels each including data frames from both of the other two input channels)

1 independent output channel and 3 merged output channels (one independent output channel including data from only a single input channel, and the other three output channels each including data from all of the other three input channels)

4 merged output channels (each of the four independent output channels containing data from all four of the input channels)

2 merged output channels, each merged within a corresponding time slot with data from only one other input channel (e.g. channel 1 merged with channel 3 and channel 2 merged with channel 4)

The architecture of the data merge unit may be divided into three main functions each of which is described in detail below. These are:

1. An input interface;
2. A frame (packet) buffer; and
3. An output interface.

The input interface is arranged to provide two sub-functions. The first of these is input rate conversion The second of these is the function of a round-robin input arbiter. The frame buffer includes a frame merge buffer, buffer access pointers and merge list tables.

Referring to FIG. 3, the architecture comprises an input rate conversion unit 14 for each of the four input channels and a round robin input arbiter 16 to receive data from the input rate conversion units 14. A common input rate conversion unit 14 may alternatively be used for all four of the input channels. The round robin input arbiter 16 is in turn connected to each of a frame merge buffer 18, a memory 20 (constructed from registers or RAM) for storing read/write and End-of-Frame (EOF) pointers and merge list tables 22. An output from each of these is provided to a round robin output arbiter 24, which is configured also to receive an input from a service timer 26. The round robin output arbiter 24 generates the interleaved data stream for processing by the logic (not shown in FIG. 3) of the network analyser 2. A channel mode signal 28 to determine a mode of operation of the data merge unit in respect of the input channels is provided to each of the round robin input arbiter 16, the round robin output arbiter 24 and the merge list tables 22.

Input Rate Conversion

The data merge unit architecture uses Time Division Multiplexing (TDM). TDM is a technique where multiplexing between inputs is performed on a fixed time-slot basis. In order to use TDM and guarantee full line rate capture, the data merge unit architecture is required to run at least N times faster than the input channel rate—where N is the number of input channels.

This requirement is generated by either running the data merge unit at N times the clock speed of the input channels, or by using N times the input data frame width throughout the data merge unit. Any combinations of clock speed and/or data width can be used such as N/2 the speed and N/2 the width for example. The exact method used in any specific example is implementation dependent.

In the present example, input data is converted to 4 times its normal width with a TDM technique based on a fixed time-slot of 1 clock cycle per input. The merge system clock runs marginally faster than the input clock. This enables the data frames to be extended such that additional data words such as a time stamp can be inserted if required.

Round-Robin Input Arbiter

A round-robin input arbiter function is used to service each input channel in turn and provide data to the frame merge buffer 18 in a defined order. The input-arbiter function could be arranged or configured to service the input-channels in any desired order. Alternatively, servicing (sampling) of the input channels could be done at one instant in time during a TDM cycle. Since the TDM technique used ensures that there is sufficient bandwidth to cope with the number of input channels at full line rate, if data on a particular channel is not available, its time-slot in the output from the round-robin input arbiter simply becomes unused.

Figure 04:
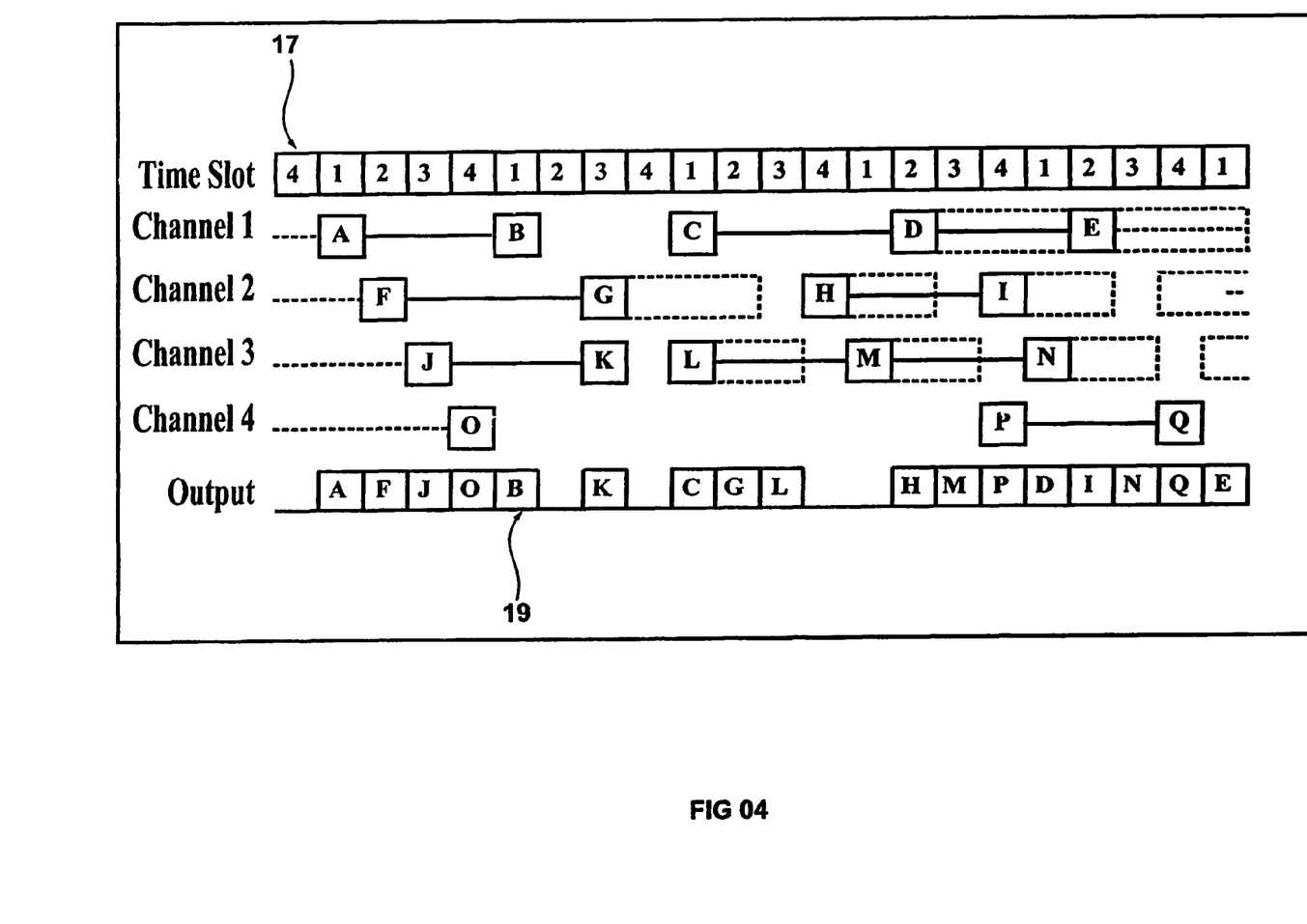

FIG. 4 shows a round-robin input arbiter timing diagram. The diagram illustrates the input arbiter's time-slot 17, each channel's input, and the input arbiter's output 19.

Each alphabetical square shown in the figure represents an input data word as generated by the input rate conversion units 14 (shown in FIG. 3). Since in this example four channels are being combined into an interleaved data stream, the input rate conversion unit (or units) increases the data width by a factor of four. It could be however that a frame is made up of a number of words that is not a multiple of four e.g. 13 words. Under these conditions, the frame is padded with additional null words so that the number of words in the frame will be a multiple of four. Padding generates more data and therefore bandwidth requirements grow whilst spacing (in clock cycles) between a padded frame and a consecutive frame can be reduced.

In FIG. 4, links are shown to indicate words belonging to a common frame. Generic data frame sizes have been used for simplicity and illustration purposes only. The dashed links simply indicate that previous and future data words on that input channel are not required for illustration purposes.

It can be seen that data words belonging to a frame on a specific channel can be received every 4 or 5 clock cycles, due to the difference mentioned above between the system clock and the input clock. It can also be seen that there can be less than 4 clock cycles between consecutive frames on any given channel. See, for example, the spacing of words K and L in channel 3. This is due to the padding as mentioned above. In this case, the last valid data word will be received from the channel before the end of the assigned time for that frame.

Inter-frame-gap, i.e. the gap between frames on the network, can also vary the number of clock cycles between frames. An example of this is shown in FIG. 4 and is the time between the last valid byte (before any packing) of frame -O and the first byte of frame P-Q on channel 4.

FIG. 4 also illustrates what happens when a time-slot is missed on any given input. The data is simply held until the next available time-slot for that output channel of input arbiter illustrated by dashed squares. See for example, the word D on input channel 1. This ability to hold data until the next available time-slot is a function that can be incorporated into the input arbiter or input rate conversion functions.

Frame Buffer

Referring again to FIG. 3, the frame merge buffer 18 is used to buffer frames for all input channels. The frame merge buffer 18 may be constructed from any random access memory (RAM) type. Examples include SRAM, DRAM, SDRAM etc. The frame merge buffer 18 is shown schematically in FIG. 3 as four sub-divided units or sub-suffers labelled channel 1, channel 2, channel 3 and channel 4. In fact, the frame merge buffer 18 may be constructed from a single RAM type memory with data addressed to correspond to the channel from which it was derived. In this example, for all channels, each sub-buffer is configured as a circular buffer. To stop overflow, each sub-buffer is required to be at least twice the size of the largest supported frame size in the analyser. As data is received from the round-robin input arbiter 16, it is stored in the channel-specific sub-buffer along with any additional frame tag data—such as End of Frame (EOF) tags.

As will be explained below, the data is read from the frame merge buffer 18 in accordance with an order determined by the round-robin output arbiter 24 in combination with the read/write/EOF pointers 20 and, optionally, merge list tables 22.

The data merge unit architecture of FIG. 3 also includes a memory 20, constructed typically from registers for storing read/write and EOF pointers. The memory 20 could also be constructed from RAM or any other suitable type of memory. In this memory 20, channel specific write and EOF pointers are incremented for all channels as data is written to the frame merge buffer 18. Read pointers are incremented for all channels as data is read from the frame merge buffer 18. The pointers are used to control access to the frame merge buffer 18 by indicating the address within the frame merge buffer from which data should be read or to which data should be written at any point in time.

The merge list tables 22 are constructed using a suitable type of RAM and are in fact look up tables of values. They are used by the data merge unit to define an order in which complete data frames are to be output from the frame merge buffer 18, when two or more channels are in merge-mode. The number of required merge list tables depends on the number of supported channels and combinations of configurations as explained above. All merge list tables are required to be mutually exclusive in that any given input channel cannot belong to more than one merge list table. Each merge list table is configured as a circular buffer. In order to stop overflow, each merge list table is required to be the size of a channel sub-buffer divided by the smallest supported data frame size in the analyser, as this dictates the maximum number of possible entries to store across all channels.

In the examples above of the possible configuration of the output data stream, in the case of 4 independent output channels no merge list would be required. In the cases of 2 independent output channels and 2 merged output channels, 1 independent output channel and 3 merged output channels and 4 merged output channels, one merge list would be required. In the case of 2 merged output channels, two merge lists would be required.

Figure 05:
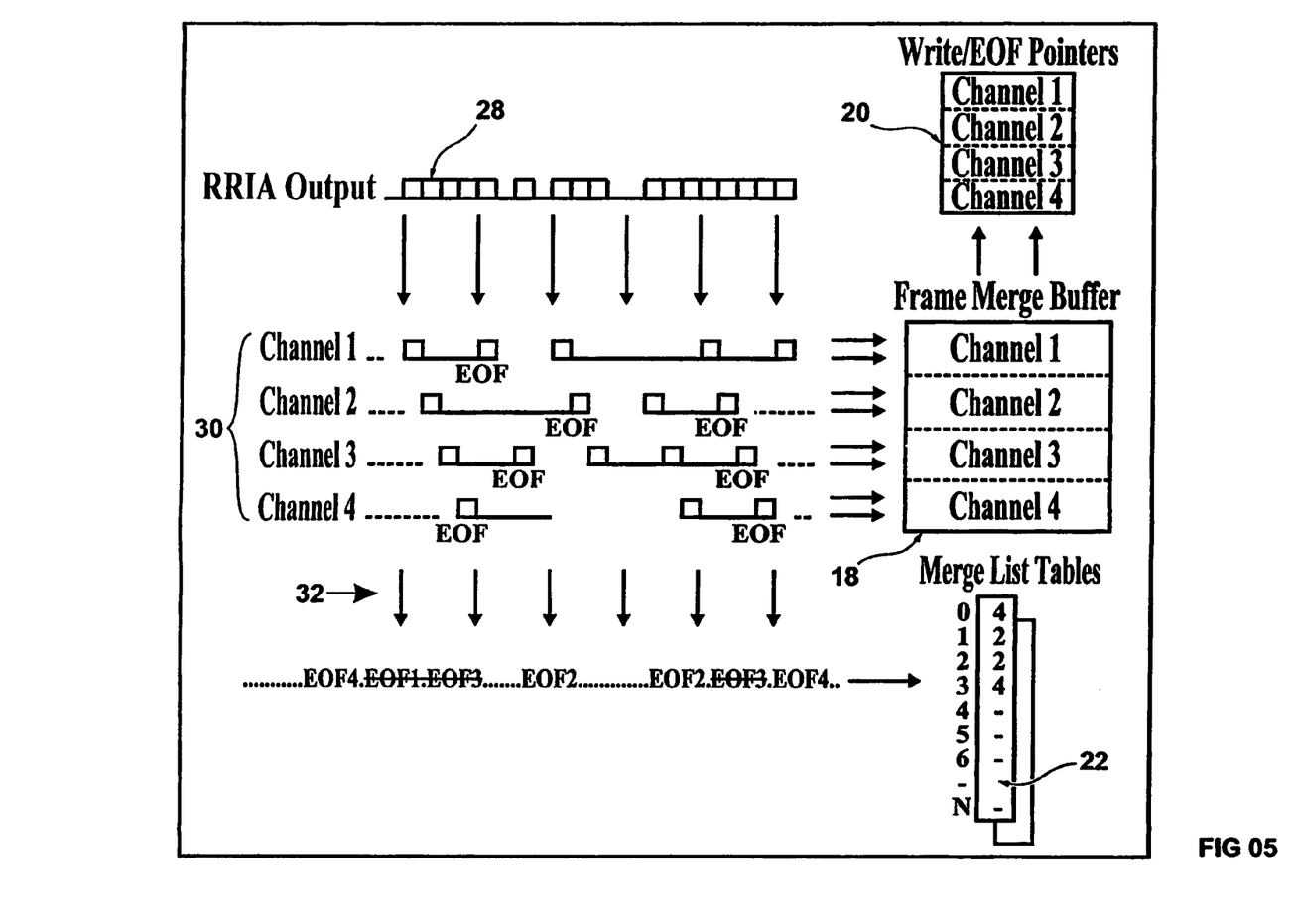

The operation of the frame merge buffer 18 and generation of merge list table 22 will now be described with reference to FIG. 5 which shows a timing diagram of data input to the frame merge buffer 18 for use in a data merge unit and network analyser according to the present invention. The round-robin input arbiter output 28 is shown sub-divided into its channels 30 for ease of explanation. In this example, channels 1 and 3 are configured as non-merge mode with channels 2 and 4 configured as merge mode. As will be explained, a merge list table will be generated which will be used in the generation of the interleaved data steam output from the round-robin output arbiter 24.

As data from the round-robin input arbiter output 28 is received by the frame merge buffer 18, each data entry is stored into the frame merge buffer 18 in the appropriate channel-specific sub-buffer. As explained above, the frame merge buffer 18 need not be actually divided into sub-buffers but the data stored must be identifiable with a specific channel. As data is stored in the frame merge buffer 18, the appropriate write and EOF pointers are also updated in the memory 20. The EOF pointer is updated when an end of frame data word is input to the frame merge buffer 18. EOF updates (tags) are extracted 32 and used to generate entries in merge list table 22. In this example, all EOF tags are extracted but those relating to channels 1 and 3 can be discarded since these channels are operating in a non-merge mode. As an EOF tag is extracted, the ID number (channel number) from which it is derived is entered into the merge list table 22, associated with a corresponding numerical index, 0 to N.

Depending on the channel mode i.e. merge mode or non-merge mode, EOF tags are used to update merge list tables. As an EOF tag is received for an enabled channel i.e. a channel in merge mode, the channel ID is written into the merge list table. Indeed, since fixed time-slots are used in a round-robin input arbiter the ordering of any concurrent EOF tags become solely dependent on the order of channel servicing by the round-robin input arbiter. As will be explained below, the merge list tables are used by the round robin output arbiter to guarantee the frame ordering on the output of the data merge unit. Write and read pointers (not shown) are used to control access to the merge list tables.

Only complete frames are ever output from the data merge unit. Complete frames are indicated by the channel specific read pointer not being equal to its corresponding EOF pointer since this indicates the last EOF tag seen for that channel and hence that valid complete frame(s) are available on that channel.

Output Interface

The output interface uses a TDM technique to output frames. The round-robin output arbiter 24 gives each channel an output time-slot. This time-slot can be anything and is implementation dependent. Typically the time-slot would be in the range of 1 clock cycle to the largest supported frame size in the analyser divided by the number of input channels. Since only complete data frames are output, 1 clock cycle will yield a single frame per output time slot. The maximum range is set to stop frame merge buffer and merge list table overflows. In order to optimise the output and generate "fairness", this time-slot is set to the largest supported data frame size divided by 4 (as in this case 4 input channels are supported and hence the output rate is running at 4 times the input rate). The time-slot duration of the round-robin output arbiter is generated by the service timer 26 (shown in FIG. 3).

Typically the service timer is used to generate a channel swap when the output time-slot is reached, with any current frame being output allowed to complete. The service timer is restarted once the trigger occurs to ensure "fairness" and to stop any overflow conditions. The exact implementation of the service timer and channel swap trigger could utilise a different scheme. For example, complete frames are only allowed to be output when there is enough time available in the remaining output time-slot. If not, then the channel swap could trigger, the service timer could restart, and the remaining output time-slot can be added to that channel's time-slot allocation next time around. The exact method is implementation dependent.

The channel mode (merge mode or non-merge mode), determines how the output time-slot within the interleaved data stream is spent.

When an output channel is running in non-merge mode, the whole output slot time corresponding to that output channel is spent outputting data (when available as complete frames) from the input channel specific sub-buffer corresponding to that output channel. Read pointers stored in memory 20 are incremented as data is read from the frame merge buffer 18. During periods when complete frames are not available, nothing is output. This process continues until the service timer 26 triggers a channel swap. If a current frame is being output, it will be allowed to complete before the swap occurs. This may be achieved by waiting until the EOF tag—read out of the frame merge buffer as stored, for that frame is output. The service timer 26 is restarted once the trigger occurs to ensure that no sub-buffer or merge list table overflow conditions can occur.

When an output channel is running in merge mode, the appropriate merge list table is used for the duration of the output slot time. This guarantees correct frame receive ordering on the output of the data merge unit. A current entry within the merge list table is used to select the correct input channel specific sub-buffer to output a current frame from. Once the frame is being output, the next entry within the merge list table is read such that the decision to change to a different input channel specific sub-buffer within the fame merge buffer 18 can be made ahead of time. This guarantees a zero delay between the output frames of merging channels (i.e. channels merging within the output time-slot) and therefore ensures that no output bandwidth is lost due to the merging process.

This process continues until the merge list table is empty. The merge list table may also indicate that no complete frames are available since an entry in the merge list table is only generated in response to detection of an EOF tag at the input stage to the frame merge buffer 18 as explained above with reference to FIG. 5. As before, during these periods nothing is output. Read pointers stored in memory 20 are incremented as data is read from the frame merge buffer 18. Again, as before the process continues until the service timer 26 triggers a channel swap (or that the current time-slot has ended), with any current frame being output allowed to complete before the swap occurs.

Figure 06:
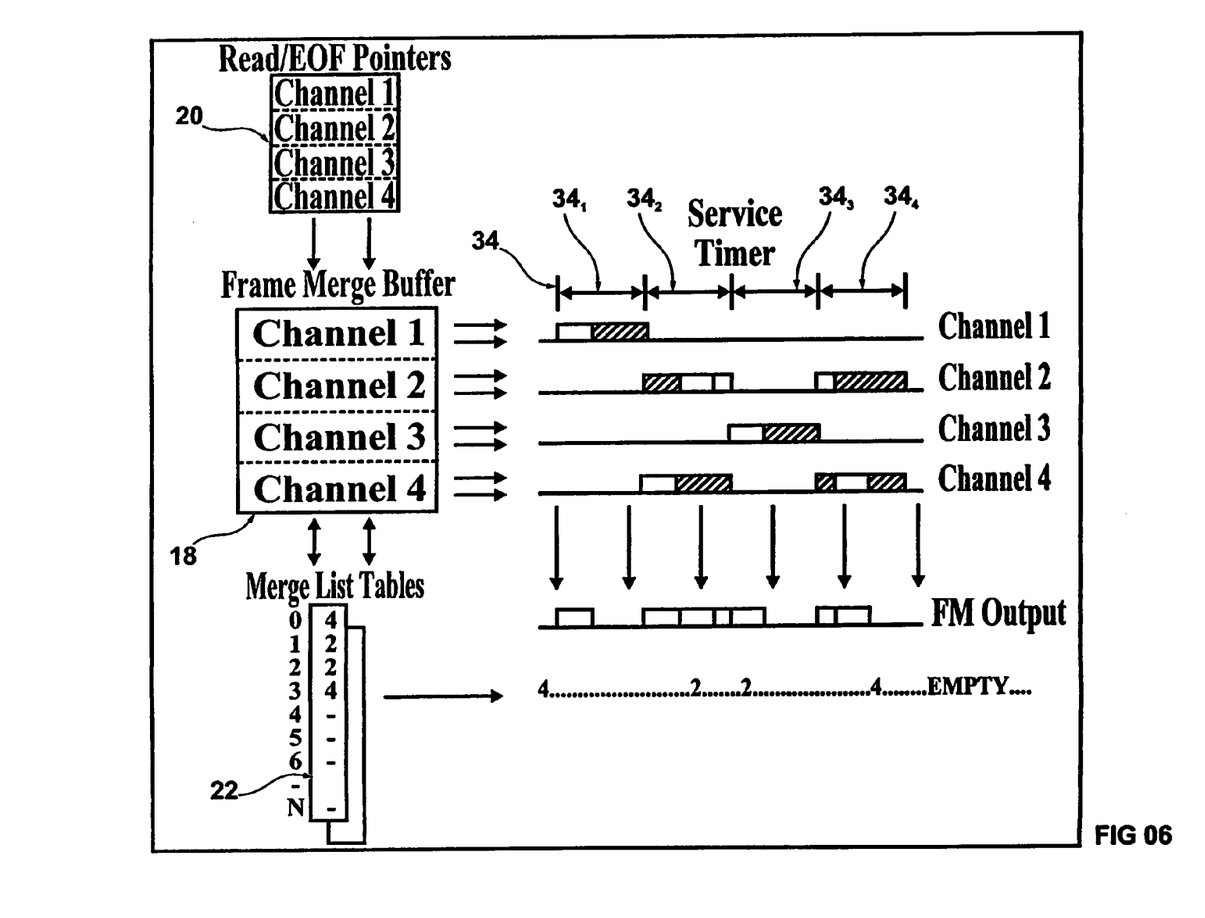

FIG. 6 shows an output interface-timing diagram and schematic block diagram of part of a data merge unit and network analyser according to one example of an embodiment of the present invention. The diagram details the output process for the example shown in FIGS. 3 and 4 and shows how the service timer based arbiter slot time function operates.

For simplicity and illustration purposes only, time-slot changes are made immediately and not on frame boundaries as explained above. Service timer slots 34 are shown. Slots $34_1$ and $34_3$, are for input channels 1 and 3 respectively which in this example are operating in non-merge mode. Slots $34_2$ and $34_4$, are for input channels 2 and 4 operating in this example in merge mode. Channels 1 and 3 are only output during their respective time-slots. For these channels the shaded regions are used to indicate the period of non-activity on the channel during its time-slot (i.e. when read pointer equals EOF pointer). Channels 2 and 4 are output as per the merge list table 22 order during channels 2 and 4 time-slots $34_2$ and $34_4$.

Effectively, in the merge mode an EOF tag—as read from the frame merge buffer, is used to advance the merge list table onto the next entry since once a frame is complete the round-robin output arbiter returns to the merge list table to determine from where (i.e. which sub-buffer) the next frame to be output should be taken. Again, for these channels operating in merge mode, periods of inactivity are shown as shaded squares and occur when the merge list table is empty. Accordingly, it may be that the interleaved data stream produced by the method of the present invention includes spaces where no data frames were received on a specific channel for a period of time. Indeed it is possible where data frames are received on some but not all input channels, that certain time-slots in the interleaved data stream are entirely empty.

It will be understood that embodiments of the present invention enable the merging of multiple input channels at channel and/or frame level into one effective data steam on the fly and at full line rate maintaining link accurate frame ordering. As explained above, there is no restriction on the number of channels, frame sizes on channels, period of sequential frames and the interleaved output combinations (single or merged) of input channels. Additionally, there is no software post-processing of captured frames and accordingly zero host CPU utilisation other than the system initialisation. The overall cost of the system is lowered by allowing use of common data processing logic and RAM.

Although not explicitly detailed, a host CPU could control the data merge unit. Specifically, host software could switch channels on and off and change their mode from non-merge (independent) to merge, as may be required. However, sufficient latency time should be allowed for by the host CPU when changing modes. The data merge unit could be provided on-board a remote PC connected via some means to a network to be analysed.

Embodiments of the present invention have been described with particular reference to the examples illustrated. However, it will be appreciated that variations and modifications may be made to the examples described within the scope of the present invention.

The invention claimed is:

1. A data merge unit for providing an interleaved data stream, the data stream including data frames received on two or more input channels, wherein complete data frames from each of the two or more input channels are arranged in time-slots of the interleaved data stream, the data merge unit comprising:
    an input unit to receive data frames from two or more input channels;
    a frame merge buffer arranged to receive data frames from the two or more input channels via the input unit and store said data frames; and
    an output generator to generate the interleaved data stream, the output generator being configured to select complete data frames from the frame merge buffer and arrange said complete data frames in the interleaved data stream,
    in which the output generator is operable in a first mode to select complete data frames in the frame merge buffer from an identified input channel and output the selected frames in a corresponding time-slot of the interleaved data stream for that input channel independently of other input channels, and, in a second mode in which complete data frames from two or more of the two or more input channels are selected from the frame merge, buffer and merged and provided in a common time-slot of the interleaved data stream.

2. A data merge unit according to claim 1, in which when operating in the second mode, a look up table of values is provided to identify one or more complete data frames from one or more input channels for transfer from the frame merge buffer for merging with one or more complete data frames from one or more other input channels in a common time-slot of the interleaved data stream.

3. A data merge unit according to claim 2, in which the look up table of values is generated in dependence on the identified ends of the data frames.

4. A data merge unit according to claim 3, in which each entry in the look up table comprises an identified input channel, each entry corresponding to the end of a data frame received on the corresponding identified input channel.

5. A data merge unit according to claim 4, in which as data is received by the frame merge buffer, if it is determined that a component data word of a data frame is the last word of the frame, a corresponding entry is made in the look up table.

6. A data merge unit for providing an interleaved data stream, the data stream including data frames received on two or more input channels, wherein complete data frames from each of the two or more input channels are arranged in time-slots of the interleaved data stream, the data merge unit comprising:
    an input unit to receive data frames from two or more input channels;
    a frame merge buffer arranged to receive data frames from the two or more input channels via the input unit and store said data frames; and
    an output generator to generate the interleaved data stream, the output generator being configured to select complete data frames of a networking protocol from the frame merge buffer and arrange said complete data frames of the said networking protocol in the interleaved data stream, in which the input unit comprises a round-robin input arbiter arranged to service each of the two or more input channels and provide data frames therefrom to the frame merge buffer.

7. A data merge unit according to claim 2, in which the output generator comprises a round-robin output arbiter arranged, when the data merge unit is operating in the second mode, to read and output a complete data frame from a corresponding input channel in the frame merge buffer in dependence on values obtained from the look up table.

8. A data merge unit according to claim 1, the data merge unit being a hardware data merge unit.

9. A data merge unit according to claim 8, in which the data merge unit is arranged in hardware selected from the group consisting of one or more Application Specific Integrated Circuits, one or more Field Programmable Gate Arrays, or any other suitably configured hardware.

10. A network analyzer, comprising:
a data merge unit according to claim 1; and
a logic unit to analyze the interleaved data stream provided by said data merge unit.

11. A network analyzer according to claim 10, in which the logic unit is configured to provide one or more functions selected from the group consisting of network management and network load balancing.

12. A method of producing an interleaved data stream of data frames received on two or more input channels in a network analyzer, the interleaved data stream being made up of complete data frames from each of the two or more input channels arranged in defined time-slots, the method comprising:
receiving at the network analyzer one or more data frames on two or more input channels;
storing said received data frames in a frame merge buffer; and
selecting complete data frames from the frame merge buffer and arranging said complete data frames in the interleaved data stream, in which the method comprises:
in a first mode outputting complete data frames from a selected input channel in a corresponding time-slot of the interleaved data stream for that input channel independently of other input channels and in a second mode merging complete data frames from at least two of the two or more input channels and providing said merged data in a common time-slot of the interleaved data stream.

13. A method according to claim 12, in which when operating in the second mode, a look up table of values is provided and used to identify one or more complete data frames from one or more input channels for transfer from the frame merge buffer for merging with one or more complete data frames from one or more other input channels in a common time-slot of the interleaved data stream.

14. A method according to claim 13, in which values in the look up table are generated in dependence on ends of data frames.

15. A method according to claim 12, in which the interleaved data stream is generated at fall line rate of the input channels.

16. A method of analyzing a network, the method comprising:
using a network analyzer, producing an interleaved data stream of complete data frames received on two or more input channels according to the method of claim 12, the data channels associated with a network to be analyzed;
providing said interleaved data stream to logic to analyze said data stream; and,
analyzing said data stream, thereby analyzing the network.

* * * * *